United States Patent

Sasaki et al.

[11] Patent Number: 6,133,182
[45] Date of Patent: Oct. 17, 2000

[54] ALUMINA BASE CERAMIC SINTERED BODY AND ITS MANUFACTURING METHOD

[75] Inventors: Toyoshige Sasaki; Mitsuyoshi Nagano; Eiji Okuma; Shinzou Mitomi, all of Fukuoka; Tetsuo Uchiyama, Saitama; Shigeo Inoue, Saitama; Haruka Tamura, Saitama, all of Japan

[73] Assignee: Nippon Tungsten Co., Ltd., Fukuoka, Japan

[21] Appl. No.: 09/319,618

[22] PCT Filed: Oct. 19, 1998

[86] PCT No.: PCT/JP98/04727

§ 371 Date: Sep. 9, 1999

§ 102(e) Date: Sep. 9, 1999

[87] PCT Pub. No.: WO99/21806

PCT Pub. Date: May 6, 1999

[30] Foreign Application Priority Data

Oct. 23, 1996 [JP] Japan ................................ 9-291426

[51] Int. Cl.[7] ........................... C04B 35/117; C04B 35/56
[52] U.S. Cl. ............................... 501/127; 501/87; 501/93; 501/96.1
[58] Field of Search ............................. 501/87, 93, 96.1, 501/127

[56] References Cited

U.S. PATENT DOCUMENTS

| | | | |
|---|---|---|---|
| 4,204,873 | 5/1980 | Yamamoto et al. | 51/307 |
| 5,188,908 | 2/1993 | Nishiyama et al. | 501/87 |
| 5,275,981 | 1/1994 | Nishiyama et al. | 501/87 |
| 5,342,564 | 8/1994 | Wei et al. | 501/87 |
| 5,916,833 | 6/1999 | Suzuki et al. | 501/87 |
| 5,994,250 | 11/1999 | Suzuki et al. | 501/87 |

FOREIGN PATENT DOCUMENTS

| | | |
|---|---|---|
| 52-52910 | 4/1977 | Japan . |
| 54-161612 | 12/1979 | Japan . |
| 4-300241 | 10/1992 | Japan . |

*Primary Examiner*—Karl Group
*Attorney, Agent, or Firm*—Jordan and Hamburg LLP

[57] ABSTRACT

This invention provides an alumina base ceramic sintered body excellent in wear resistance with high hardness, also with high strength and high toughness, and particularly suitable for a cutting tool or wear resistant member. This sintered body contains 5–70 % by volume of WC and 5–70% by volume of Ti (C,N) solid solution having a C/N mole ratio ranging from 1:9 to 9:1, the WC and Ti (C,N) having particle sizes of 5 μm or less, respectively.

7 Claims, No Drawings

ALUMINA BASE CERAMIC SINTERED BODY AND ITS MANUFACTURING METHOD

TECHNICAL FIELD

This invention relates to alumina base ceramics excellent in wear resistance with high hardness, high strength and high toughness, and particularly suitable for a cutting tool or a wear resistant member.

BACKGROUND OF TECHNOLOGY

Such alumina base ceramics have been used as a cutting tool or a wear resistant member for high-speed machining and hot working where a conventional tool material such as a tool steel, a high-speed steel, a cemented carbide or the like is difficult to use, because of its comparable easiness for producing a compact sintered body among conventional ceramic materials.

However, the alumina base ceramics is disadvantaously limited in use because of their poor strength and toughness.

Sintered $Al_2O_3$ dispersion-strengthened with carbide or carbo-nitride particles such as TiC or Ti (C,N) in order to improve the properties, so-called black ceramics have been developed. However, such black ceramics is lack in reliability when applied for machining under a heavy load such as rough cutting of steel or cast iron, because of its insufficient strength and toughness.

Further, since a sintered $Al_2O_3$ added with WC particles is improved significantly in strength and toughness, and has a high hardness, it has been tried to apply to wear resistant members.

For example, Japanese Patent Laid-Open No. 3-290355 discloses that a high hardness and high toughness sintered body having a density of more than 90% of the theoretical can be provided by subjecting a starting powder consisting of $Al_2O_3$ added with 10–90% by volume of WC to normal sinterinig, hot pressing, or hot isostatic pressing.

It is also disclosed in Japanese Patent Laid-Open No. 5-279121 that a sintered body obtained by adding 5–95 wt % of WC to $Al_2O_3$ followed by sintering at 1400–1950° C., and making $W_2C$ phase appear due to existence of oxygen of 0.05–6 wt. % in the WC starting powder is excellent in strength and toughness.

However, these $Al_2O_3$-WC ceramics can not exhibit sufficient wear resistance under a severe condition of high-speed cutting of steel or cast iron, since the oxidation resistance at high temperature is insufficient although it is surely excellent in strength and toughness. Therefore, these ceramics are hardly used for a member requiring high-temperature wear resistance such as cutting tool.

DISCLOSURE OF INVENTION

The purpose of this invention is to provide alumina base ceramics remarkably improved in strength and toughness while preserving excellent oxidation resistance and wear resistance during machining under a severe condition.

This invention provides a dense sintered body of $Al_2O_3$ which contains 5–70% by volume of WC and 5–70% by volume of Ti (C,N) solid solution, and this sintered body exhibits high strength, high toughness, and excellent wear resistance even at a high temperature.

Alumina powder having an α-crystalline phase of 90 vol. % or more and an average particle size of 5 μm or less is preferably used.

The strength and toughness are remarkably improved by adding WC particles to the $Al_2O_3$ sintered body. This improvement is resulted from the dispersion strengthening by highly hard WC particles and the toughening by the action of the residual stress due to the difference in thermal expansion coefficient between $Al_2O_3$ particles and WC particles caused when the temperature lowers from the sintering temperature to room temperature between the two kinds of grains. The addition of WC to $Al_2O_3$ has an effect of suppressing the grain growth in the sintering, whereby the fine grains are maintained to strengthen the sintered body.

The content of WC is determined within the range of 5–70% by volume. When the content of WC is less than 5% by volume, the improvement in strength and toughness of the sintered body is little because of small amount of WC phase. But, when it exceeds 70% by volume, the oxidation resistance at high temperature tends to deteriorate in addition to the difficulty of providing a dense sintered body. However, a dense sintered body can be provided even with a WC addition of up to 70% by volume by subjecting a sintered body having a relative density of 95% or more formed by hot pressing to HIP (hot isostatic pressing) treatment. Although the improvement in strength and toughness depends on the volume fraction of WC, the sintering is difficult when the addition of WC inferior in self-sintering ability is 70% by volume or more, so that a dense sintered body can not be provided.

Although the strength and toughness are remarkably improved by the addition of WC to $Al_2O_3$, compared with a mono-phase $Al_2O_3$ sintered body, to provide a sinteled body resistant to impact, the excellent wear resistance possessed by $Al_2O_3$ is lost and, particularly, the wear resistance at high temperature is significantly deteriorated. However, by incorporation of Ti (C,N) into $Al_2O_3$, improvement of the strength and thermal shock resistance is brought out by dispersion strengthening. Further, the wear due to the oxidation or the reaction with a counter material at high temperature is also small. Thus the high wear resistance originally possessed by $Al_2O_3$ can be kept. The mole ratio of C:N in Ti (C,N) is particularly effective within the range of 1:9–9:1.

According to this invention, the $Al_2O_3$ base ceramic sintered body is able to reveal excellent wear resistance together with high strength and high toughness by simultaneously including prescribed quantities of both of WC and Ti (C,N).

Sintering agents such as MgO, $Y_2O_3$, CaO, $ZrO_2$, and the like have generally been used in sintering of Alumina base ceramics to promote the sintering. Although it is facilitated to sinter to dense material by using these agents, oxide agent phases existing independently or compound phases formed by the reaction between $Al_2O_3$ and oxide agents are grown to deteriorate the strength, the hardness, and the wear resistance under severe machining condition.

In the $Al_2O_3$ base ceramics of this invention, since no sintering agent is used. It is one of features that no deterioration in various mechanical properties resulted from those agents. Thus the $Al_2O_3$ based ceramics of this invention basically consist of only three phases of $Al_2O_3$, WC and Ti (C,N).

Free carbon in the starting powder exists as a foreign matter of several μm to several tens μm size in the slintered body and causes a reduction in bending strength and, in its turn a chipping or breaking off of the cutting tool during machining. In order to reduce influence of free carbon, it is allowed to add W, Ti, or the like up to 1.0 vol. % which has high affinity with carbon and gives no deterioration to the sintered material. In this case, the addition of W, Ti, or the like takes place the reaction between these additives and carbon to make WC, TiC or the like. Thus the residual free carbon is eliminated by these reactions during the sintering to contribute to the improvement of reliability.

The $Al_2O_3$ base ceramics of this invention can be produced by sufficiently mixing the starting powder mixture having the defined copstion, and hot pressing the resulting mixture at 1600–1900° C. for 0.5–5 hours in an inert gas atmosphere at a pressure of 50–300 kgf/cm².

It may also be produced by adding a slight quantity of a binder to the powders, molding by use of metal mold or cold isostatic pressing or the both, and then sintering at 1600–1900° C. for 0.5–5 hours in an inert gas atmosphere and, as occasion of demands, further performing a hot isostatic pressing at 1400–1700° C. in an inert gas atmosphere at a pressure of 500–2000 atm.

MOST PREFERRED EXAMPLE OF INVENTION

Table 1 shows the relationship of tested compositions with resulted various properties. In the table, the sample number of No. 1 to No. 14 are examples of this invention having a composition within the range defined. No. 15 to No. 29 are for the comparison, in which No. 15 to No. 25 are out of the range of composition defined by this invention, and No. 26 to No. 29 show examples of conventional ceramic cutting tools.

The respective samples were prepared by weighting and putting a prescribed quantities of a starting powder having average particle sizes of 2 μm or less into a ball mill, mixing those with a methanol for 20 hours followed by drying and hot pressing the resulting prepared powder in a carbon die at a temperature of 1700° C. for 60 minutes at a pressure of 20–25 MPa for 60 minutes. The resulting sintered body was cut and ground into bending test pieces of 3×4×40 mm and cutting tool inserts according to the standard of JIS SNGN 432, which are subjected to various tests.

In the table, the wear resistance test was performed by use of work material of FCD 450 of Φ 250×500 mm with a cutting speed of 200 m/min, a depth of cut of 1.5 mm, and a feed of 0.2 mm/rev, and the time forming a flank wear of 0.5 mm was set as life time, whereby the wear resistance was evaluated.

The impact resistance test for examining the resistance for chipping or breaking off of a tool was performed by use of a work material of Φ 250×500 mm with four notches to give impact while constantly keeping a cutting speed of 200 m/min and a depth of cut of 1.5 mm, and changing the feed.

In the cutting test for a chilled cast steel of Φ 400×500 mm ,the wear resistance test was performed with a cutting speed of 70 m/min, a depth of cut of 1.5 mm, and a feed of 0.2 mm/rev, and evaluated by comparing the time forming a flank weal of 1.0 mm with the life time of conventional cutting tools.

The followings were clarified from the results of these tests.

Under the condition of so-called dry cutting using no coolant for both cooling and lubrication in machining, wear resistance is deteriorated because of the low oxidation resistance of WC. The deterioration of wear resistance is proportional to the added volume of WC, and the performance as tool is exhibited with 40 vol % or less and, preferably, 30 vol % or less of WC. However, under a wet condition using coolant, oxidation of WC is suppressed because the temperature at the cutting edge is not raised so high, and a significant improvement in the impact resistance or chipping resistance resulted from the enhanced grain fall-off resistance due to the toughening effect was rather recognized.

Further, the wear resistance effect by Ti (C,N) in addition to the toughening effect by WC was performed in both WC and Ti (C,N) incorporated alumina to lead a long time cutting of the material difficult to cut in high efficient machining impossible for the conventional cutting tools.

The effect begins to exhibit with a total addition of WC and Ti (C,N) of 40% by volume or more, and becomes remarkable with 50–80% by volume. With less than 50% by volume, the volume ratio of alumina is high, which leads to a reduction in toughness, and with above 80% by volume, the sintering becomes difficult, and the hardness, the strength and the toughness are reduced by the presence of pores in the sintered body, resulting in the deterioration of the performance as a cutting tool.

Thus, when a sintered body consists of 5–70% by volume of WC, 5–70% by volume of Ti (C,N), and the remainder consisting of alumina having an α-phase ratio of 90% by volume or more and inevitable impurities, a material combining excellent wear resistance and improved toughness can be provided.

In the composition according to this invention, the bonding strength between crystal grains is enhanced by the effect of WC, the wear resistance is also improved by Ti (C,N) to reduce the adhesive wear, and materials difficult, to cut can be machined with a high efficiency as shown in the examples of chilled cast steel cutting.

As seen in the table, although a desired performance could be established in a range of TiC:TiN ratio of Ti (C,N) from 1:9 to 9:1, the effect of addition of TiN was revealed when the content of TiN was too much as No. 15 and an early chipping or breaking-off by its low hardness was recognized. When the content of TiC was too much as No. 16, the addition effect of TiC was revealed to slightly deteriorate the sintering performance, so that pores were apt to be left, and a promoted early wear was caused on chilled cast steel cutting.

The conventional ceramic cutting tools shown as No. 26 to No. 29 in Table 1 have not been used for machining metallic materials called as "materials difficult to cut" such as chilled cast steel or forged steel since the toughness values of these cutting tools are very low level.

Since an alumina base ceramic cutting tool is excellent in wear resistance but inferior in material strength, it can not be used for an application requiring tool toughness in the case of an interrupted cutting or machining of materials difficult to cut. A cemented carbide cutting tool is highly resistant to impact because of its high strength and toughness, but tends to be worn in the early stage by the cutting heat in machining. This is particularly remarkable, on high-speed cutting. Although a $Si_3N_4$ cutting tool can perform a high-speed cutting because it consists of ceramics containing no metal ingredient and has high impact resistance because of its high strength and high toughness, the adhesive and fall-off wear is going on by the reaction with the iron in the work material, and worn in the early stage, so that $Si_3N_4$ is not suitable for a material difficult to cut such as chilled cast steel. Further, for black ceramics and cemented carbide coating, the fall-off of grains appears as a wear or minute chipping in addition to breaking off or chipping, and their lives were consequently shortened.

INDUSTRIAL APPLICABILITY

The alumina base ceramic sintered body according to this invention is widely usable for members requiring toughness and wear resistance, and is sufficiently resistant under a severe condition of a high load at a high temperature, for example, as high-speed rough cutting of cast iron or steel.

TABLE 1

| Sample No. | Composition (vol %) WC | TiCN | W | Ti | MgO | Y₂O₃ | Al₂O₃ | TiCN ratio TiC:TiN | Relative Density % | Hardness HRA | Bending Strength MPa | Fracture Toughness MPam-1/2 | Wear Resistance Test Cutting time min | Break-Off Resistance Test FCD cutting | Chilled cast Steel Cutting Cutable time: min |
|---|---|---|---|---|---|---|---|---|---|---|---|---|---|---|---|
| 1 | 40 | 10 | 0.2 | | | | 50 | 5:5 | 99.7 | 94.3 | 1002 | 3.9 | 18 | ○ | 42 |
| 2 | 30 | 20 | | 0.1 | | | 50 | 5:5 | 100.0 | 93.6 | 1000 | 3.9 | 16 | ○ | 40 |
| 3 | 20 | 30 | 0.1 | | | | 50 | 5:5 | 100.0 | 93.7 | 950 | 3.6 | 18 | ○ | 41 |
| 4 | 10 | 40 | | 0.2 | | | 50 | 5:5 | 100.0 | 93.8 | 950 | 3.7 | 15 | ○ | 38 |
| 5 | 60 | 10 | 0.2 | | | | 30 | 5:5 | 99.8 | 94.7 | 970 | 4.8 | 13 | ⊙ | 37 |
| 6 | 10 | 60 | | | | | 30 | 5:5 | 99.7 | 94.5 | 950 | 4.7 | 16 | ⊙ | 33 |
| 7 | 40 | 40 | 0.2 | 0.2 | | | 20 | 5:5 | 99.6 | 94.5 | 920 | 4.2 | 12 | ⊙ | 35 |
| 8 | 35 | 35 | 0.2 | 0.2 | | | 30 | 5:5 | 99.7 | 94.4 | 880 | 4.1 | 14 | ○ | 37 |
| 9 | 30 | 30 | | | | | 40 | 5:5 | 99.8 | 94.3 | 850 | 4.0 | 15 | ○ | 34 |
| 10 | 25 | 25 | | | | | 50 | 5:5 | 99.8 | 94.0 | 840 | 4.1 | 15 | ○ | 35 |
| 11 | 20 | 20 | | | | | 60 | 5:5 | 99.9 | 93.9 | 800 | 3.7 | 17 | ○ | 40 |
| 12 | 15 | 15 | | | | | 70 | 5:5 | 100.0 | 93.7 | 780 | 3.6 | 19 | ○ | 38 |
| 13 | 30 | 30 | | | | | 40 | 2:8 | 99.8 | 94.3 | 860 | 4.1 | 15 | ○ | 32 |
| 14 | 30 | 30 | | | | | 40 | 8:2 | 99.8 | 94.0 | 800 | 3.9 | 16 | ○ | 35 |
| 15 | 30 | 30 | | | | | 40 | 0.2:9.8 | 99.5 | 93.4 | 680 | 3.5 | 14 | ○ | Break-off in 10 min |
| 16 | 30 | 30 | | | | | 40 | 9.8:0.2 | 99.2 | 94.0 | 710 | 3.6 | 11 | ○ | worn in 22 min |
| 17 | 80 | 10 | | | | | 10 | 5:5 | 95.2 | 93.0 | 620 | 3.3 | 5 | X | Break-off in 5 min |
| 18 | 60 | 0 | | | | | 40 | 5:5 | 99.6 | 94.5 | 930 | 4.3 | 13 | ○ | worn in 22 min |
| 19 | 40 | 0 | | | | | 60 | 5:5 | 99.7 | 94.2 | 900 | 3.8 | 11 | ○ | worn in 26 min |
| 20 | 10 | 80 | | | | | 10 | 5:5 | 94.0 | 92.8 | 590 | 3.1 | 3 | X | Break-off in 5 min |
| 21 | 0 | 60 | | | | | 40 | 5:5 | 99.8 | 93.9 | 750 | 3.7 | 19 | Δ | Break-off in 22 min |
| 22 | 0 | 40 | | | | | 60 | 5:5 | 99.9 | 93.8 | 720 | 3.6 | 21 | Δ | Break-off in 17 min |
| 23 | 30 | 20 | | | | | 50 | 5:5 | 100.0 | 93.9 | 820 | 3.8 | 16 | ○ | worn in 21 min |
| 24 | 30 | 20 | | | 0.2 | | 50 | 5:5 | 100.0 | 93.8 | 800 | 3.8 | 15 | X | worn in 24 min |
| 25 | 40 | 40 | | | | 0.2 | 20 | 5:5 | 95.1 | 93.2 | 610 | 3.1 | 4 | X | Break-off in 5 min |
| 26 | Alumina (pure Al₂O₃) | | | | | | | | 99.6 | 93.5 | 700 | 3.1 | 25 | X | Break-off in 2 min |
| 27 | Black ceramics (Al₂O₃-30TiC) | | | | | | | | 99.9 | 94.0 | 800 | 3.5 | 21 | X | Break-off in 7 min |
| 28 | Silicone nitride (Si₃N₄) | | | | | | | | 98.9 | 93.5 | 1200 | 7.0 | 8 | ⊙ | worn in 15 min |
| 29 | Cemented carbide coating | | | | | | | | 100.0 | 91.0 | 230 | 10.0 | 12 Cutting timeup to flankwear of 0.5 mm | ⊙ | worn in 12 min |

⊙ more than 0.7 mm/rev
○ 0.7–0.5 mm/rev
Δ 0.5–0.3 mm/rev
X: less than 0.3 mm/rev What claimed is:

1. An alumina base ceramic sintered body with high strength and high toughness consisting of 5–70% by volume of WC, 5–70% by volume of Ti (C,N), and remainder of $Al_2O_3$.

2. An alumina base ceramic sintered body according to claim 1 consisting only three phases of $Al_2O_3$, VWC, and Ti (C,N).

3. An alumina base ceramic sintered body according to claim 1 wherein the α-phase ratio in $Al_2O_3$ crystal is 90% by volume or more.

4. An alumina base ceramic sintered body according to claim 1 and 2 wherein mole ratio of C:N in Ti (C,N) is within the range of 1:9 to 9:1.

5. An alumina base ceramic sintered body according to claim 1 wherein the average grain size of each of $Al_2O_3$, WC and Ti (C,N) is 5 μm or less, respectively.

6. An alumina base ceramics according to any one of claims 1 to 5 which is used for a cutting tool or a wear resistant member.

7. A method for producing an alumina base ceramics which comprises blending and sufficiently mixing powders of $Al_2O_3$, WC, Ti (C,N) having average particle sizes of 2 μm or less, respectively, so that the WC powder is 5–70% by volume, the Ti (C,N) powder is 5–70% by volume, and the remainder is $Al_2O_3$ powder, sintering the resulting powder mixture by any one of ordinary temperature sintering, hot pressing, and hot isostatic pressing, or the combination thereof.

* * * * *